United States Patent
Ishiguro et al.

(10) Patent No.: US 7,522,726 B2
(45) Date of Patent: *Apr. 21, 2009

(54) TRANSMITTER DEVICE, TRANSMITTING METHOD, RECEIVER DEVICE, RECEIVING METHOD, COMMUNICATION SYSTEM, AND PROGRAM STORAGE MEDIUM

(75) Inventors: Ryuji Ishiguro, Tokyo (JP); Munetake Ebihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 122 days.

This patent is subject to a terminal disclaimer.

(21) Appl. No.: 11/207,798

(22) Filed: Aug. 22, 2005

(65) Prior Publication Data

US 2006/0056624 A1 Mar. 16, 2006

Related U.S. Application Data

(63) Continuation of application No. 09/641,312, filed on Aug. 18, 2000.

(30) Foreign Application Priority Data

Aug. 26, 1999 (JP) ............... 11-239205

(51) Int. Cl.
 *H04L 9/00* (2006.01)
 *G06F 12/14* (2006.01)
 *H04N 7/167* (2006.01)

(52) U.S. Cl. ............... 380/46; 380/201; 380/230; 380/232; 713/161; 713/165; 713/168; 713/194; 705/51

(58) Field of Classification Search .............. 380/46
 See application file for complete search history.

(56) References Cited

U.S. PATENT DOCUMENTS

| | | | |
|---|---|---|---|
| 4,652,874 A | 3/1987 | Loyer | |
| 4,723,120 A | 2/1988 | Petty, Jr. | |
| 4,903,016 A | 2/1990 | Murai et al. | |
| 5,007,051 A | 4/1991 | Dolkas et al. | |

(Continued)

FOREIGN PATENT DOCUMENTS

DE 31 51 492 7/1983

(Continued)

OTHER PUBLICATIONS

Loytynoja et al, Hash-based Counter Scheme for Digital Rights Management, 2005, IEEE, pp. 121-124.*

(Continued)

*Primary Examiner*—Christopher A Revak
*Assistant Examiner*—Aravind K Moorthy
(74) *Attorney, Agent, or Firm*—Oblon, Spivak, McClelland, Maier & Neustadt, P.C.

(57) ABSTRACT

A memory stores a hash value of content management data. When an IEEE1394 interface authenticates a personal computer connected thereto via a network, the IEEE1394 transmits content management data to the personal computer while receiving a hash data of the content management data from the personal computer. The IEEE1394 interface then determines whether the received hash value of the content management data matches the stored hash value of the content management data. This arrangement prevents the unauthorized copying of content data, and limits the number of uses of the content data.

13 Claims, 12 Drawing Sheets

U.S. PATENT DOCUMENTS

| | | | |
|---|---|---|---|
| 5,400,246 | A | 3/1995 | Wilson et al. |
| 5,418,527 | A | 5/1995 | Yashiro |
| 5,420,724 | A | 5/1995 | Kawamura et al. |
| 5,435,599 | A * | 7/1995 | Bernecker ............... 283/70 |
| 5,455,569 | A | 10/1995 | Sherman et al. |
| 5,475,835 | A | 12/1995 | Hickey |
| 5,481,750 | A | 1/1996 | Parise et al. |
| 5,515,211 | A | 5/1996 | Kawamura |
| 5,537,605 | A | 7/1996 | Teece |
| 5,539,390 | A | 7/1996 | Nagano et al. |
| 5,657,221 | A | 8/1997 | Warman et al. |
| 5,671,412 | A * | 9/1997 | Christiano ............ 707/104.1 |
| 5,687,334 | A | 11/1997 | Davis et al. |
| 5,712,834 | A | 1/1998 | Nagano et al. |
| 5,719,937 | A | 2/1998 | Warren et al. |
| 5,729,717 | A | 3/1998 | Tamada et al. |
| 5,778,064 | A | 7/1998 | Kori et al. |
| 5,787,259 | A | 7/1998 | Haroun et al. |
| 5,790,876 | A | 8/1998 | Shima et al. |
| 5,793,366 | A | 8/1998 | Mano et al. |
| 5,815,631 | A | 9/1998 | Sugiyama et al. |
| 5,847,771 | A | 12/1998 | Cloutier et al. |
| 5,850,573 | A | 12/1998 | Wada |
| 5,875,108 | A | 2/1999 | Hoffberg et al. |
| 5,887,193 | A | 3/1999 | Takahashi et al. |
| 5,896,454 | A | 4/1999 | Cookson et al. |
| 5,940,513 | A | 8/1999 | Aucsmith et al. |
| 5,963,450 | A | 10/1999 | Dew |
| 5,973,748 | A | 10/1999 | Horiguchi et al. |
| 5,987,126 | A | 11/1999 | Okuyama et al. |
| 6,064,764 | A * | 5/2000 | Bhaskaran et al. ........... 382/183 |
| 6,189,146 | B1 * | 2/2001 | Misra et al. ............... 717/177 |
| 6,209,092 | B1 | 3/2001 | Linnartz |
| 6,223,285 | B1 | 4/2001 | Komuro et al. |
| 6,233,589 | B1 | 5/2001 | Balcha et al. |
| 6,343,281 | B1 | 1/2002 | Kato |
| 6,367,012 | B1 | 4/2002 | Atkinson et al. |
| 6,463,151 | B1 | 10/2002 | Iitsuka et al. |
| 6,463,534 | B1 | 10/2002 | Geiger et al. |
| 6,490,355 | B1 | 12/2002 | Epstein |
| 6,523,113 | B1 | 2/2003 | Wehrenberg |
| 6,526,146 | B1 | 2/2003 | Hashimoto et al. |
| 6,539,094 | B1 | 3/2003 | Osakabe et al. |
| 6,542,610 | B2 | 4/2003 | Traw et al. |
| 6,611,534 | B1 | 8/2003 | Sogabe et al. |
| 6,622,249 | B1 | 9/2003 | Komuro et al. |
| 6,636,551 | B1 | 10/2003 | Ikeda et al. |
| 6,640,294 | B2 | 10/2003 | Debiez et al. |
| 6,857,067 | B2 | 2/2005 | Edelman |
| 6,868,403 | B1 | 3/2005 | Wiser et al. |
| 2005/0138401 | A1 * | 6/2005 | Terao et al. ............... 713/189 |
| 2005/0195975 | A1 * | 9/2005 | Kawakita ............... 380/30 |
| 2006/0015746 | A1 * | 1/2006 | Kusudo et al. ............ 713/187 |
| 2006/0206943 | A1 * | 9/2006 | Ellison et al. ............. 726/26 |

FOREIGN PATENT DOCUMENTS

| | | |
|---|---|---|
| EP | 0 371 719 | 6/1990 |
| EP | 0 573 204 | 12/1993 |
| EP | 0 626 635 | 11/1994 |
| EP | 0 637 157 | 2/1995 |
| EP | 0 727 729 | 8/1996 |
| JP | 4-97468 | 3/1992 |
| JP | 7-134628 | 5/1995 |
| WO | WO 96/07971 | 3/1996 |

OTHER PUBLICATIONS

Lu et al, Robust mesh-based hashing for copy detection and tracing of images, 2004, IEEE, pp. 731-734.*

U.S. Appl. No. 09/622,517, filed Aug. 17, 2000, Mitsuru Tanabe et al.

U.S. Appl. No. 09/576,621, filed May 23, 2000, Ryuji Ishiguro et al.

A. Gefrides et al., "Standard Bus Connects Up To 126 Peripherals: Plug and Play With USB," Computers XXXI (1996) No. 3, May 1996, pp. 36-38.

G. Hoffman et al., "IEEE 1394: A Ubiquitous Bus," IEEE May 3, 1995, pp. 334-338.

D. Bursky, "Networking Scheme Exploits Existing RS-232 Interface," Electronic Design, vol. 35, No. 13, May 1997, pp. 65-68.

IEEE Standard for a High Performance Serial Bus, IEEE Computer Society, IEEE Standard 1394-1995, Aug. 1996.

* cited by examiner

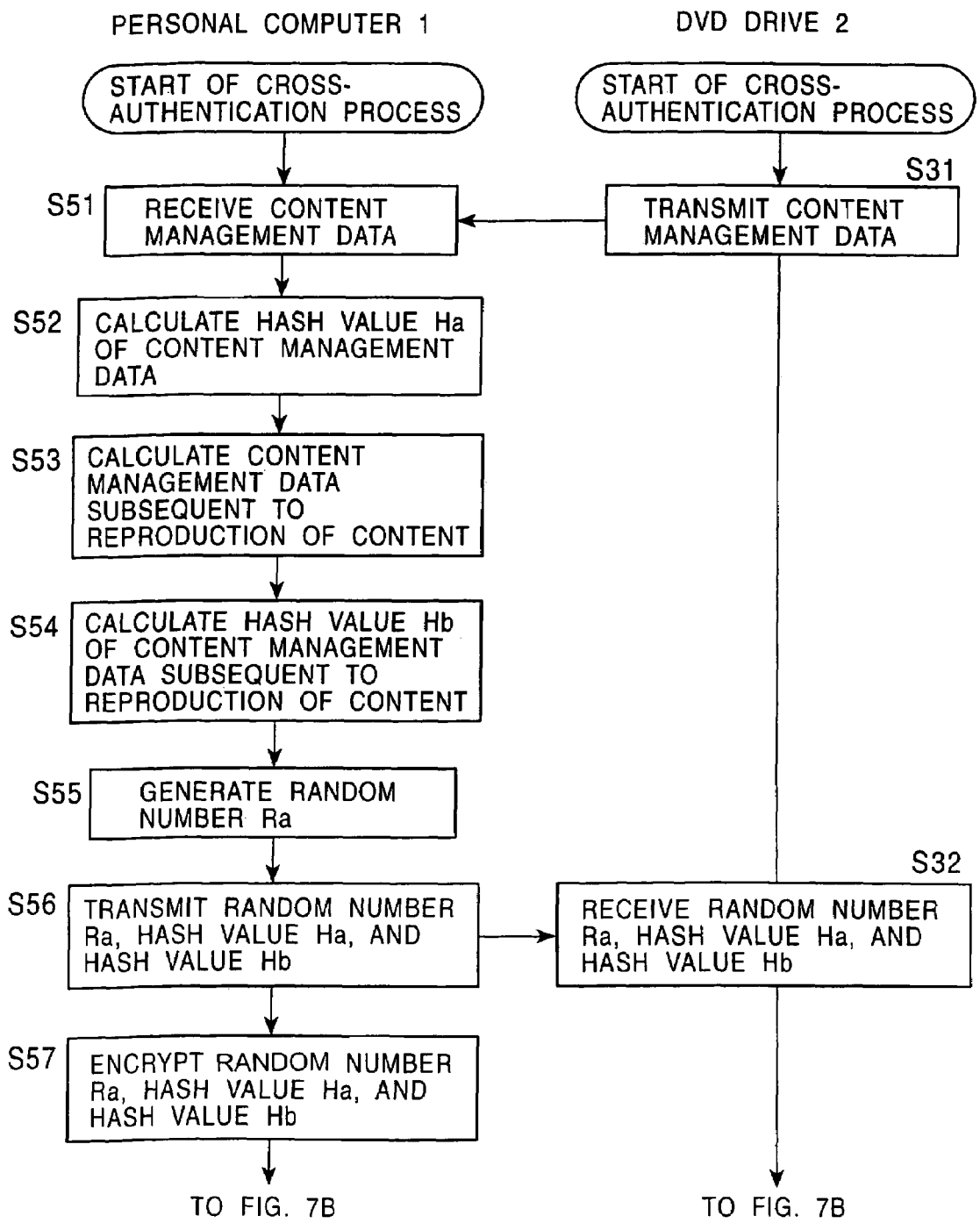

TRANSMITTER DEVICE, TRANSMITTING METHOD, RECEIVER DEVICE, RECEIVING METHOD, COMMUNICATION SYSTEM, AND PROGRAM STORAGE MEDIUM

CROSS-REFERENCE TO RELATED APPLICATIONS

This application is a continuation of U.S. patent application Ser. No. 09/641,312, filed Aug. 18, 2000, and further is based upon and claims the benefit of priority from the prior Japanese Patent Application No. 11-239205, filed Aug. 26, 1999, the entire contents of each of which are incorporated herein by reference.

BACKGROUND OF THE INVENTION

1. Field of the Invention

The present invention relates to a transmitter device, a transmitting method, a receiver device, a receiving method, a communication system, and a program storage medium, and, more particularly, a transmitter device, a transmitting method, a receiver device, a receiving method, a communication system, and a program storage medium, for preventing unauthorized copying of content data and for limiting the number of uses of the content data.

2. Description of the Related Art

Providers, who provide content data such as images and sound, or computer programs to a user, typically encrypt the content data before supplying them to the user in order to prevent unlimited copying of the content data.

In this environment, only an authorized user who owns a predetermined encryption/decryption key can use the content data.

To further strongly prevent unauthorized use of the content data, some devices use a technique which allows a unit for reproducing content data and a unit for driving a recording medium storing the content data to mutually or cross authenticate each other.

To limit the number uses of the content data, a provider stores, in a recording medium, data to be used for management of the number of uses of the content data, together with the content data, and provides these data to a user. When the device for driving the recording medium reads the content data stored in the recording medium, the device determines, based on the data for the management of the number of uses of the content data, whether the number of reads of the content data exceeds a predetermined number. When the number of reads of the content data exceeds the predetermined number, the provider inhibits the use of the content data.

The data managing the number of uses is stored in a recording medium together with the content data. If the data managing the number of the uses is transferred back to the original recording medium after the use of the content data, the user uses the content data unlimited number of times.

When the content data is moved to a second recording medium, the data managing the number of the uses may be moved to a third recording medium together with the content data. After the content data is moved to the second recording medium, the data managing the number of the uses may be moved back to the original recording medium from the third recording medium along with the content data. In this way, a user may copy the content data unlimited number of times.

In the movement process of the content data to another recording medium, the copying of the content data is repeatedly performed unlimited number of times by impeding the deletion of the content data or the data managing the number of the uses. The user can freely use the content data in a limitless fashion.

SUMMARY OF THE INVENTION

Accordingly, it is an object of the present invention to prevent the unauthorized copying of content data and to limit the number of uses of the content data.

In a first aspect of the present invention, a transmitter device includes a storage unit for storing an encrypted value of second data, a communication unit which, in the authentication of a receive device, transmits the second data to the receiver device while receiving an encrypted value of the second data from the receiver device, and a determination unit which, in the authentication of the receiver device, determines whether the encrypted value of the second data received by the communication unit matches the encrypted value of the second data stored in the storage unit.

Preferably, the storage unit inhibits the writing or reading of the encrypted value of the second data in a process other than the authentication process.

Preferably, the storage unit has a tamper resistance.

In a second aspect of the present invention, a transmitting method includes the step of storing an encrypted value of second data, the step of communication, in the authenticating of the receiver device, for transmitting the second data to the receiver device and for receiving an encrypted value of the second data from the receiver device, and, in the authenticating of the receiver device, the step of determining whether the encrypted value of the second data received in the communication step matches the encrypted value of the second data stored in the storing step.

In a third aspect of the present invention, a program storage medium stores a transmission process program. The program includes the step of storing an encrypted value of second data, the step of communication, in the authenticating of a receiver device, for transmitting the second data to the receiver device and for receiving an encrypted value of the second data from the receiver device, and, in the authenticating of the receiver device, the step of determining whether the encrypted value of the second data received in the communication step matches the encrypted value of the second data stored in the storing step.

In a fourth aspect of the present invention, a receiver device includes a communication unit which, in the authenticating of a transmitter device, receives, from the transmitter device, second data that describes a limitation on the usage of first data while transmitting an encrypted value of the second data to the transmitter device, and encrypted value generator for generating the encrypted value of the second data based on the second data received by the communication unit, in the authenticating of the transmitter device.

Preferably, the receiver device includes a random number generator for generating a random number having a predetermined bit number, and the communication unit transmits, to the transmitter device, the encrypted value of the second data together with the random number generated by the random number generator.

Preferably, the receiver device includes a usage limiting data generator which generates, subsequent to the reception of the first data, third data which describes a limitation on the usage of the first data based on the second data received by the communication unit. The encrypted value generator generates an encrypted value of the third data generated by the usage limiting data generator, and the communication unit transmits, to the transmitter device, the encrypted value of the second data together with the encrypted value of the third data.

In a fifth aspect of the present invention, a receiving method includes the step of communication, in the authenticating of a transmitter device, for receiving, from the transmitter device, second data that describes a limitation on the usage of first data and for transmitting an encrypted value of the second data to the transmitter device, and, in the authenticating of the transmitter device, the step of generating an encrypted value of the second data based on the second data received in the communication step.

In a sixth aspect of the present invention, a program storage medium stores a reception process program. The program includes the step of communication, in the authenticating of a transmitter device, for receiving, from the transmitter device, second data that describes a limitation on the usage of first data and for transmitting an encrypted value of the second data to the transmitter device, and, in the authenticating of the transmitter device, the step of generating an encrypted value of the second data based on the second data received in the communication step.

In a seventh aspect of the present invention, a communication system includes a transmitter device and a receiver device. The transmitter device includes a storage unit for storing an encrypted value of second data, a first communication unit which, in the authenticating of the receiver device, transmits the second data to the receiver device while receiving an encrypted value of the second data from the receiver device, and a determination unit which, in the authenticating of the receiver device, determines whether the encrypted value of the second data received by the first communication unit matches the encrypted value of the second data stored in the storage unit. The receiver device includes a second communication unit which, in the authenticating of the transmitter device, receives the second data from the transmitter device while transmitting the encrypted value of the second data to the transmitter device, and an encrypted value generator for generating the encrypted value of the second data based on the second data received by the second communication unit, in the authenticating of the transmitter device.

In accordance with the first, second, and third aspects of the present invention, to authenticate the receiver device, the transmitter device stores the encrypted value of the second data, and transmits the second data to the receiver device, while receiving the encrypted value of the second data from the receiver device, and determines whether the encrypted value of the received second data matches the encrypted value of the stored second data.

In accordance with the fourth, fifth, and sixth aspects of the present invention, to authenticate the transmitter device, the receiver device receives, from the transmitter device, the second data that describes the limitation on the usage of the first data while transmitting the encrypted value of the second data to the transmitter device, and generates the encrypted value of the second data based on the received second data.

In accordance with the seventh aspect of the present invention, to authenticate the receiver device, the transmitter device stores the encrypted value of the second data, and transmits the second data to the receiver device, while receiving the encrypted value of the second data from the receiver device, and determines whether the encrypted value of the received second data matches the encrypted value of the stored second data; and to authenticate the transmitter device, the receiver device receives, from the transmitter device, second data that describes the limitation on the usage of the first data while transmitting the encrypted value of the second data to the transmitter device, and generates the encrypted value of the second data based on the received second data.

BRIEF DESCRIPTION OF THE DRAWINGS

FIG. 7A is a flow diagram illustrating the process of the cross-authentication.

DESCRIPTION OF THE PREFERRED EMBODIMENTS

Figure 1:
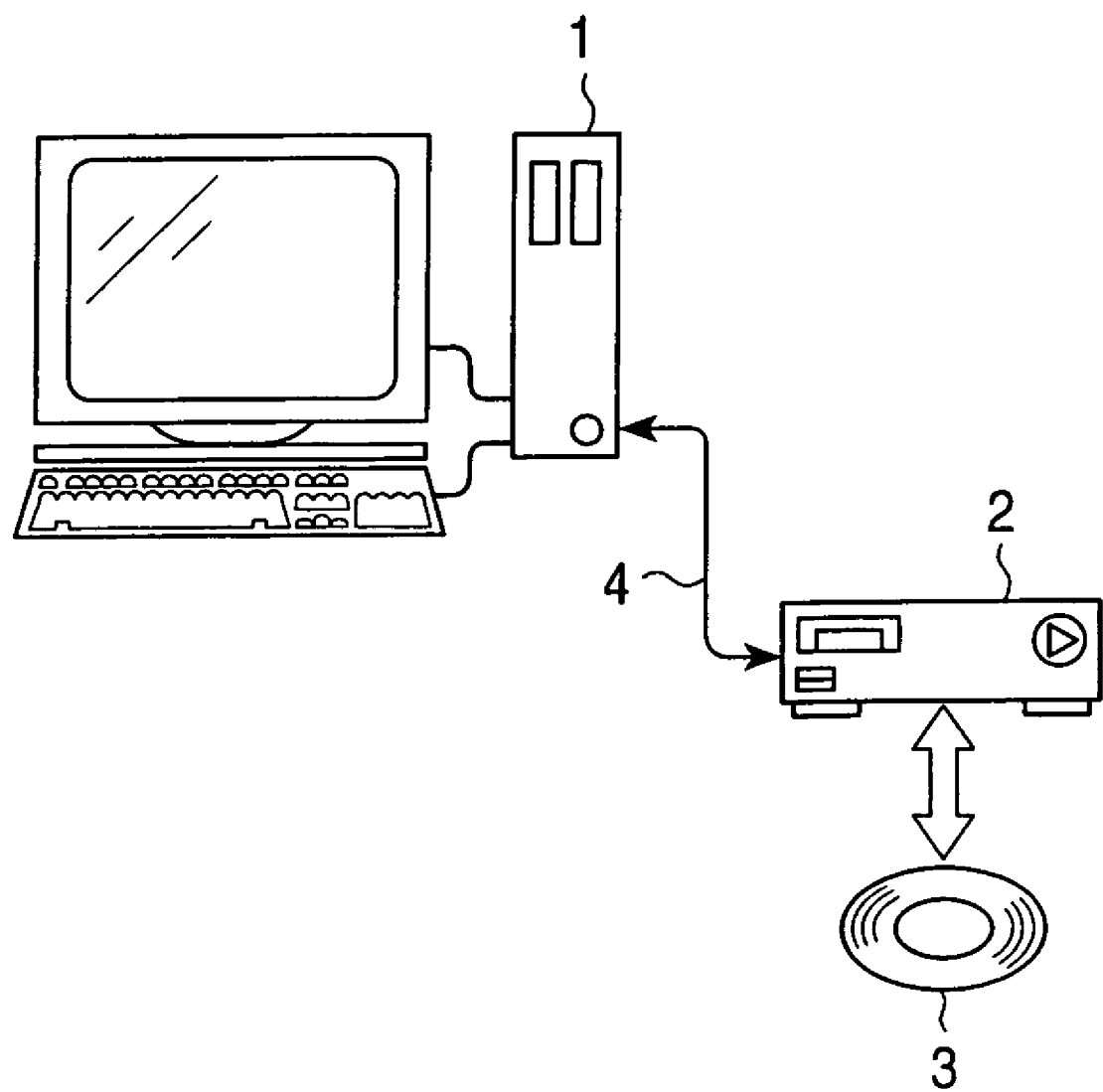
FIG. 1 illustrates one embodiment of a recording system of the present invention.

FIG. 1 illustrates one embodiment of the recording system of the present invention. A personal computer 1 is connected to a DVD (Digital Versatile Disk) drive 2 through a network 4 that complies with the IEEE (Institute of Electrical and Electronic Engineers) 1394 Standard.

The personal computer 1 performs a cross authentication with the DVD drive 2 before the DVD 2 supplies content data, such as sound or images (moving images or still images). In the cross-authentication process, the personal computer 1 receives, through the network 4, content management data describing the condition on the use of the content data supplied by the DVD drive 2. The personal computer 1 updates the content management data in accordance with the usage of the content data by the personal computer 1 (in response to the reproduction and copying of the content data).

The personal computer 1 determines hash values, i.e., one-way encrypted values, of the received content management data and the updated content management data, by applying one-way hash function such as the MD (Message Digest) 5 hash function to each of the content management data received from the DVD drive 2 and the updated content management data.

The personal computer 1 sends the hash values of the received content management data and the updated content management data to the DVD drive 2 together with a random number generated thereby.

After the cross-authentication process with the DVD drive 2, the personal computer 1 receives, from the DVD drive 2, the content data (encrypted), namely, data such as sound and images, and a content key that has encrypted the content data.

The personal computer 1 decrypts the content data with the content key, and reproduces the decrypted content data.

In the cross-authentication process, the DVD drive 2 reads content management data stored in a DVD 3, and sends the content management data to the personal computer 1 via the network 4. In the cross-authentication process, the DVD drive 2 receives, from the personal computer 1, the hash value of the content management data, the hash value of the updated content management data, and the random number generated by the personal computer 1.

After the cross-authentication with the personal computer 1, the DVD drive 2 reads the content data, namely, the data of sound and images, and the content key recorded onto the loaded DVD 3, and sends these data to the personal computer 1 via the network 4.

The DVD drive 2 stores, in a memory to be discussed later, a storage key, which is an encryption key which has encrypted the content key stored in the DVD 3, and a hash value, i.e., a value that has been obtained by applying the hash function to the content management data.

The DVD 3 stores the content data encrypted with the content key, the content key, i.e., the encryption key that has encrypted the content data, and the content management data for managing the usage of the content data.

The content data stored in the DVD 3 is encrypted with the content key through a common key encryption system such as the DES (Data Encryption Standard) or IDEA (International Data Encryption Algorithm).

The content management data is used to manage the content stored in the DVD 3 in connection with the number of reproductions, the copying of the content data to another recording medium, and the movement of the content data to another recording medium, and the operation for any of these steps is authorized.

The content management data contains data indicating the authorized usage of the content data (for instance, the reproduction of the content, the copying of the content data, and the movement of the content data), and data indicating the number of the reproductions of the content data and the number of the copying of the content data. When the content data is used, the content management data is changed in the value thereof in response to the usage of the content data.

The content key is encrypted with the storage key stored in the memory in the DVD drive 2.

In accordance with the IEEE1394 Standard, the network 4 supplies the DVD drive 2 with the data output by the personal computer 1, while supplying the personal computer 1 with the data output by the DVD drive 2.

Figure 2:
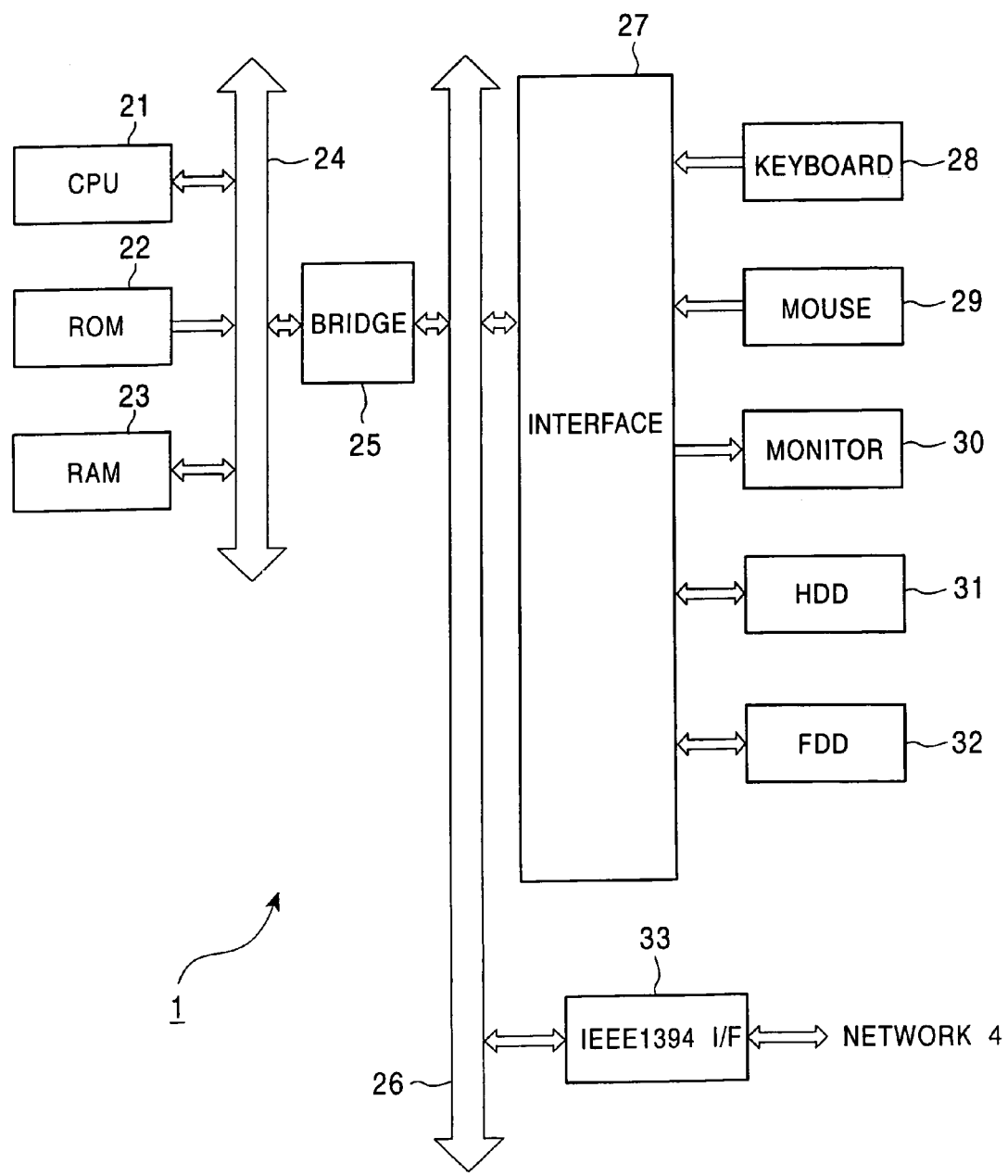
FIG. 2 is a block diagram illustrating the construction of a personal computer 1.

FIG. 2 is a block diagram illustrating the construction of the personal computer 1. A CPU (Central Processor Unit) 21 executes a variety of application programs and an OS (Operating System). A ROM (Read-Only Memory) 22 stores programs executed by the CPU 21, and arithmetic parameters having essentially constant-value data. A RAM (Random-Access Memory) 23 stores programs executed by the CPU 21 in operation, and parameters that vary in the execution of the programs. Theses components are interconnected by a host bus 24 composed of a CPU bus and a memory bus.

The host bus 24 is connected to an external bus 26 such as a PCI (Peripheral Component Interconnect/Interface) bus, through a bridge 25.

A user operates a keyboard 28 to enter a diversity of commands to the CPU 21, and a mouse 29 to point to or select a location on screen. A monitor 30 may be a liquid-crystal display device or a CRT (Cathode Ray Tube), and displays a variety of information in text or image. An HDD (Hard Disk Drive) 31 and a FDD (Floppy Disk Drive) 32 respectively drive a hard disk and a floppy disk, and record or reproduce programs and information, respectively onto or from the hard disk and the floppy disk. The keyboard 28 through the FDD 32 are interconnected to each other through an interface 27, and the interface 27 is connected to the CPU 21 through the external bus 26, the bridge 25, and the host bus 24.

An IEEE1394 interface board 33 is connected to the network 4. The IEEE1394 interface board 33 assembles data supplied by the CPU 21 or HDD 31 into a packet specified by the IEEE1394 Standard, and transmits the packet over the network 4. The IEEE1394 interface board 33 receives data assembled in a received packet and output the data to the CPU 21 or HDD 31. The IEEE1394 interface board 33 also performs predetermined process in accordance with the IEEE1394 Standard.

The IEEE1394 interface board 33 is connected to the CPU 21 through the external bus 26, the bridge 25, and the host bus 24.

Figure 3:
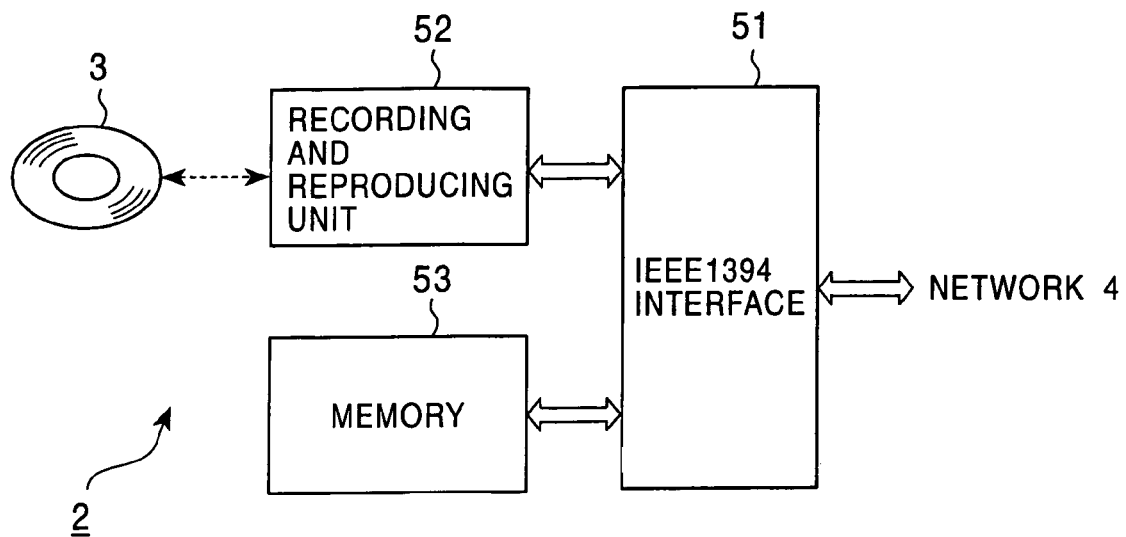
FIG. 3 is a block diagram illustrating the construction of a DVD drive 2.

Referring to a block diagram shown in FIG. 3, the construction of the DVD drive 2 is now discussed. An IEEE1394 interface board 51 is connected to the network 4, and assembles data supplied by a recording and reproducing unit 52 or a memory 53 into a packet specified by the IEEE1394 Standard. The IEEE1394 interface board 51 sends the packet over the network 4 to the personal computer 1, while outputting data in a packet received through the network 4 from the personal computer 1 to the recording and reproducing unit 52 or the memory 53. The IEEE1394 interface board 51 also performs predetermined process in accordance with the IEEE1394 Standard.

The IEEE1394 interface board 51 performs a cross-authentication process with the personal computer 1. Only during the cross-authentication process, the IEEE1394 interface board 51 reads the data stored in the memory 53 while storing predetermined data onto memory 53.

The memory 53 having an aluminum layer makes it difficult for a third party to understand the internal structure thereof, even if the memory 53 is physically disassembled. The memory 53 is a semiconductor memory and has a tamper resistance that permits the memory 53 to operate within a predetermined limited voltage range so that the memory 53 is hard to separately operate. The memory 53 stores the storage key and the hash value of the content management data.

The recording and reproducing unit 52 is loaded with the DVD 3. The recording and reproducing unit 52 reads, from the loaded DVD 3, the content data, the content key, and the content management data, and outputs these data to the IEEE1394 interface board 51. The recording and reproducing unit 52 feeds the loaded DVD 3 with the content data, the content key, and the content management data supplied through the IEEE1394 interface board 51.

Figure 4:
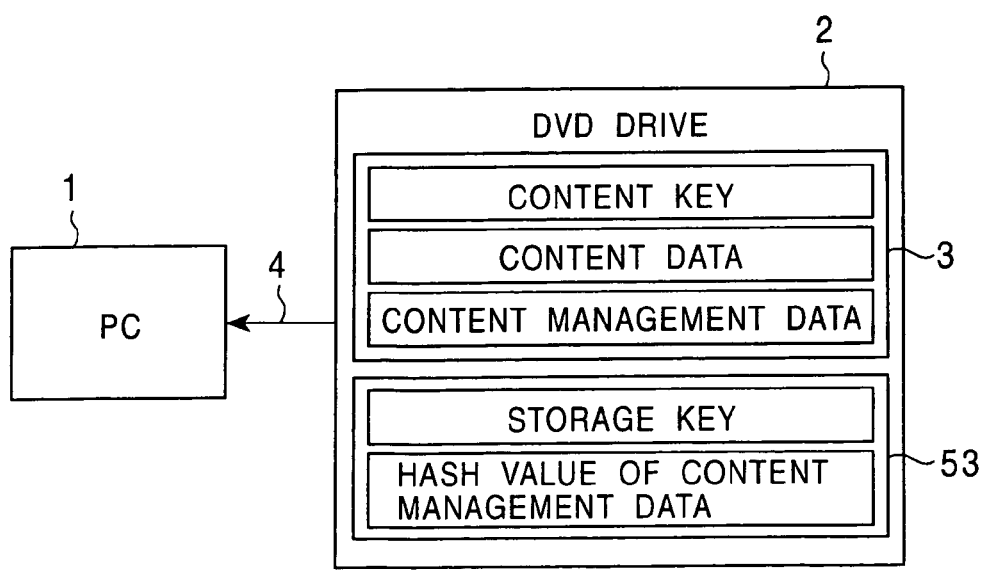
FIG. 4 illustrates data stored in the DVD drive 2 or a DVD drive 3.

FIG. 4 illustrates the data stored in the DVD drive 2 and the data recorded in the DVD 3. The DVD 3 records the content key encrypted by the storage key, the content data encrypted by the content key, and the content management data for managing the usage of the content data.

The memory 53 of the DVD 2 stores the storage key, and the hash value that has been obtained by applying the predetermined hash function on the content management data. The storage key or the hash value of the content management data is read from the memory 53 or is updated in value, only when the IEEE1394 interface board 51 performs a cross-authentication process with the personal computer 1.

Figure 5:
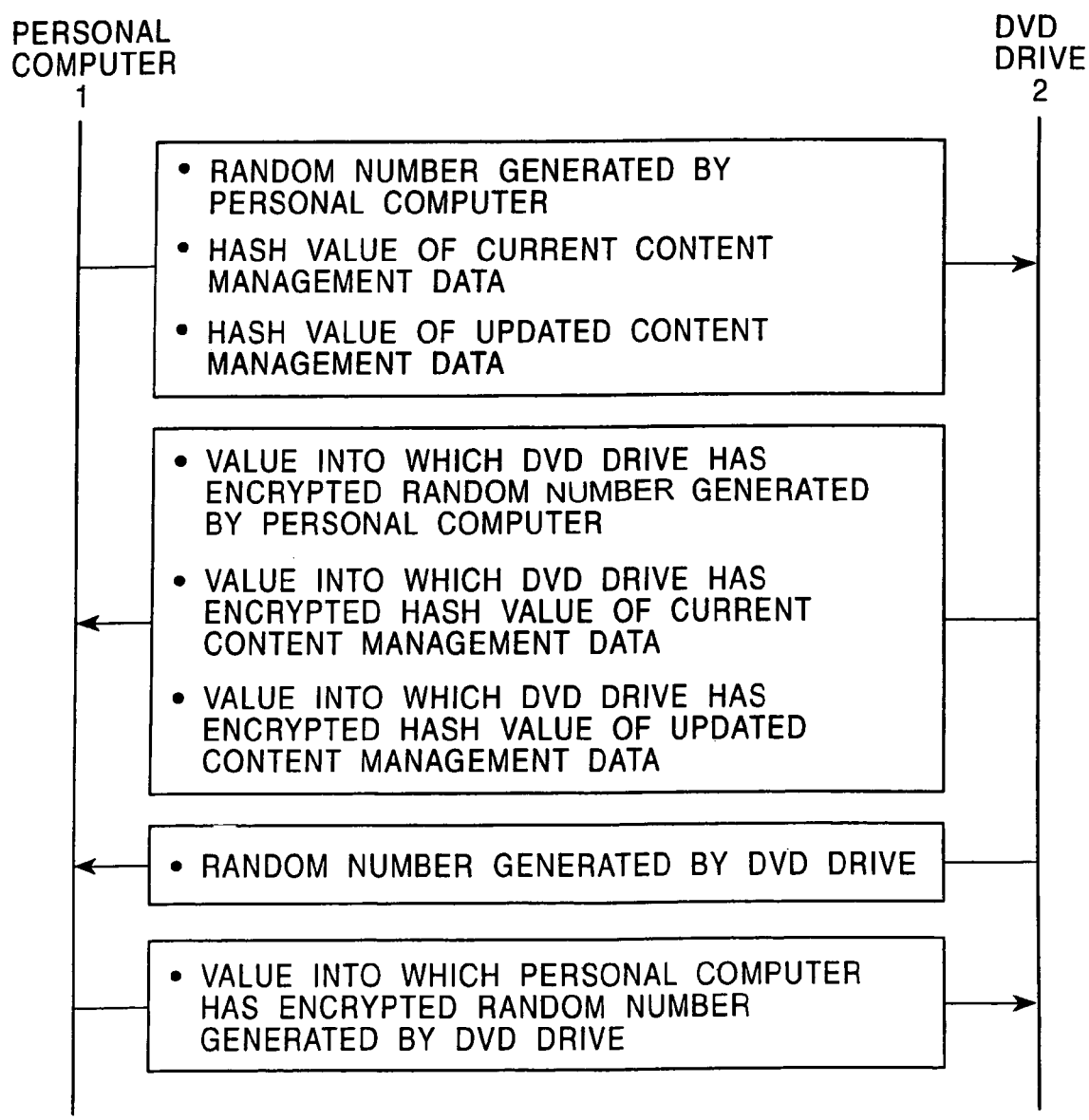
FIG. 5 illustrates part of data that is transmitted through a network 4 when the DVD drive 2 and the personal computer 1 mutually authenticate each other in a cross-authentication process.

FIG. 5 illustrates part of data transmitted through the network 4 when the DVD drive 2 and the personal computer 1 perform the cross-authentication process. In the cross-authentication process involved in the usage of the content data, the personal computer 1 generates a random number having a predetermined number of bits (for instance, 64 bits), while updating the current content management data received from the DVD drive 2 in response to the usage of the content data, and generating the updated content management data.

The personal computer 1 applies the one-way hash function such as the MD5 to each of the content management data received from the DVD drive 2 and the updated content management data, thereby determining the hash values of the received content management data and the updated content management data.

The personal computer 1 transmits to the DVD drive 2 the generated random number, the hash value of the current content management data, and the hash value of the updated content management data.

When the DVD drive 2 receives the random number generated by the personal computer 1, the current hash value of the content management data, and the hash value of the content management data updated by the personal computer 1, the DVD drive 2 encrypts the random number generated by the personal computer 1, the current content management data, and the updated content management data.

The DVD drive 2 transmits, to the personal computer 1, the encrypted random number generated by the personal computer 1, the encrypted current content management data, and the encrypted updated content management data.

The DVD drive 2 generates and transmits a random number having a predetermined number of bits (for instance, 64 bits) to the personal computer 1.

The personal computer 1 encrypts the random number having the predetermined number of bits from the DVD drive 2, and then sends the encrypted random number to the DVD drive 2.

Figure 6:
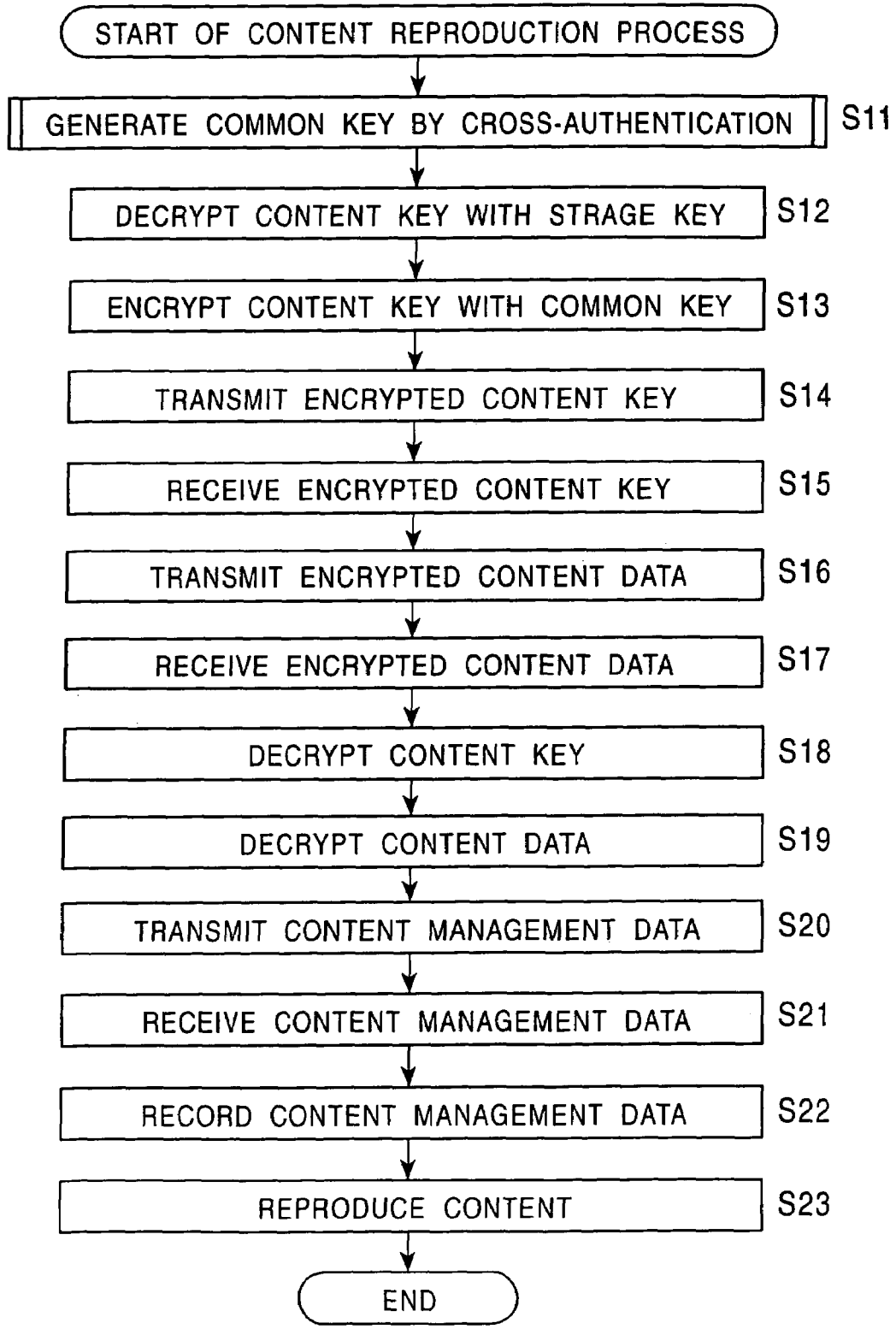
FIG. 6 is a flow diagram illustrating a reproduction process of content data.

The reproduction of the content in the recording system of the present invention is now discussed, referring to a flow diagram shown in FIG. 6. In step S11, the personal computer 1 and the DVD drive 2 perform a cross-authentication process, thereby generating a common key. The cross-authentication process will be discussed in detail later, referring to flow diagrams shown in FIG. 7A and FIG. 7B. In step S12, the IEEE1394 interface board 51 in the DVD drive 2 reads the storage key from the memory 53, and causes the recording and reproducing unit 52 to read the content key stored in the loaded DVD 3. The read process for reading the storage key stored in the memory 53 may be carried out in the cross-authentication process in step S11. The IEEE1394 interface board 51 decrypts the content key with the storage key.

In step S13, the IEEE1394 interface board 51 encrypts the content key with the common key generated in step S11. In step S14, the IEEE1394 interface board 51 sends the content key encrypted with the common key to the personal computer 1 via the network 4.

In step S15, the IEEE1394 interface board 33 in the personal computer 1 receives, via the network 4, the content key encrypted with the common key, transmitted by the DVD drive 2. In step S16, the IEEE1394 interface board 51 in the DVD drive 2 causes the recording and reproducing unit 52 to read, from the loaded DVD 3, the content data encrypted with the content key. The IEEE1394 interface board 51 in the DVD drive 2 sends, to the personal computer 1 via the network 4, the content data encrypted with the content key.

In step S17, the IEEE1394 interface board 33 in the personal computer 1 receives the content data encrypted with the content key, and transmitted by the DVD drive 2. In step S18, the CPU 21 in the personal computer 1 decrypts the content key, received in step S15, with the common key generated in step S11.

In step S19, the CPU 21 in the personal computer 1 decrypts the content data, received in step S17, with the decrypted content key.

In step S20, the IEEE1394 interface board 33 in the personal computer 1 sends the content management data, updated in the cross-authentication process in step S11, to the DVD drive 2 through the network 4. In step S21, the IEEE1394 interface board 51 in the DVD drive 2 receives the updated content management data. In step S22, the recording and reproducing unit 52 stores the updated content management data in the loaded DVD 3.

In step S23, the personal computer 1 reproduces the content from the decrypted content data. The reproduction process ends.

In this way, the personal computer 1 receives the content key and the content data from the DVD drive 2, thereby reproducing the content.

Figure 7B:
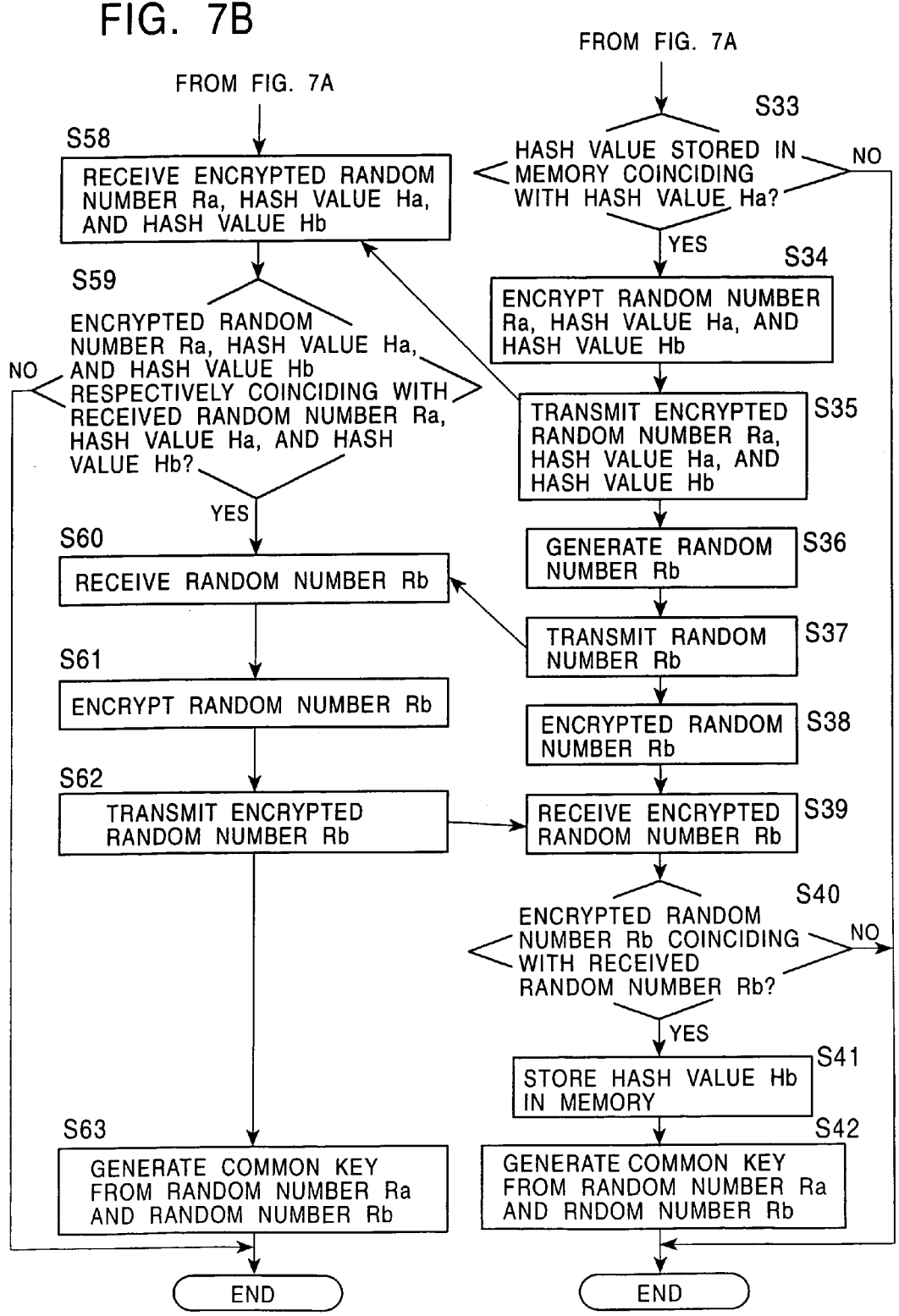
FIG. 7B is a continuation of the flow diagram of FIG. 7A.

FIGS. 7A and 7B are flow diagrams illustrating the cross-authentication process performed between the personal computer 1 and the DVD drive 2, corresponding to the process step in step S11 in the flow diagram shown in FIG. 6. In step S31, the IEEE1394 interface board 51 in the DVD device 2 causes the recording and reproducing unit 52 to read the content management data from the loaded DVD 3. The IEEE1394 interface board 51 sends the content management data to the personal computer 1 via the network 4.

In step S51, the IEEE1394 interface board 33 in the personal computer 1 receives, via the network 4, the content management data transmitted by the DVD drive 2. In step S52, the CPU 21 in the personal computer 1 applies the one-way hash function such as the MD5 to the content management data received from the DVD drive 2, thereby calculating the hash value Ha of the content management data.

In step S53, the CPU 21 in the personal computer 1 calculates post-reproduction content management data in response to the reproduction of the content. In step S54, the CPU 21 in the personal computer 1 calculates the hash value Hb of the post-reproduction content management data by applying the hash function such as the MD5 to the post-reproduction content management data.

In step S55, the CPU 21 in the personal computer 1 generates the random number Ra of 64 bits, for instance. In step S56, the IEEE1394 interface board 33 in the personal computer 1 sends to the DVD drive 2 via the network 4 the random number Ra, the hash value Ha, and the hash value Hb.

In step S32, the IEEE1394 interface board 51 in the DVD drive 2 receives the random number Ra, the hash value Ha, and the hash value Hb from the personal computer 1. In step S33, the IEEE1394 interface board 51 in the DVD drive 2 determines whether the hash value of the content management data stored in the memory 53 matches the hash value Ha received in step S32. When it is determined that the hash value of the content management data stored in the memory 53 fails to match the hash value Ha received in step S32, the content management data is considered to have been tampered with, and the cross-authentication process is aborted.

When it is determined in step S33 that the hash value of the content management data stored in the memory 53 matches the hash value Ha received in step S32, the content management data is considered to be free from any tampering, and the process goes to step S34. The IEEE1394 interface board 51 in the DVD drive 2 encrypts the random number Ra, the hash value Ha, and the hash value Hb, received in step S32.

In step S35, the IEEE1394 interface board 51 in the DVD drive 2 sends the encrypted random number Ra, the encrypted hash value Ha, and the encrypted hash value Hb to the personal computer 1.

In step S57, the CPU 21 in the personal computer 1 encrypts the random number Ra, the hash value Ha, and the hash value Hb.

If both the personal computer 1 and the DVD drive 2 are legitimate, the encryption system and the encryption key in step S34 of the IEEE1394 interface board 51 in the DVD drive 2 are respectively identical to the encryption system and the encryption key in step S57 of the CPU 21 of the personal computer 1. The encrypted random number Ra, the encrypted hash value Ha, and the encrypted hash value Hb provided by the personal computer 1 are respectively identical to the encrypted random number Ra, the encrypted hash value Ha, and the encrypted hash value Hb provided by the DVD drive 2.

In step S58, the IEEE1394 interface board 33 in the personal computer 1 receives the encrypted random number Ra, the encrypted hash value Ha, and the encrypted hash value Hb from the DVD drive 2 via the network 4. In step S59, the CPU 21 in the personal computer 1 respectively compares, for matching, the random number Ra, the hash value Ha, and the hash value Hb, encrypted in step S57, with the encrypted random number Ra, the encrypted hash value Ha, and the encrypted hash value Hb, received in step S58. When it is determined that the random number Ra, the hash value Ha, and the hash value Hb, encrypted in step S57, fail to respectively match with the counterparts received, if any, the DVD drive 2 is not legitimate, the DVD drive 2 is not authenticated, and the process ends.

In step S36, the IEEE1394 interface board 51 in the DVD drive 2 generates a random number Rb of 64 bits. In step S37, the IEEE1394 interface board 51 in the DVD drive 2 sends the generated random number Rb to the personal computer 1 via the network 4. In step S38, the IEEE1394 interface board 51 in the DVD drive 2 encrypts the random number Rb.

When it is determined in step S59 that the encrypted random number Ra, the encrypted hash value Ha, and the encrypted hash value Hb respectively match the received encrypted random number Ra, the received encrypted hash value Ha, and the received encrypted hash value Hb, the DVD drive 2 is legitimate. The process goes to step S60. The IEEE1394 interface board 33 in the personal computer 1 receives the random number Rb from the DVD drive 2 via the network 4.

In step S61, the CPU 21 in the personal computer 1 encrypts the random number Rb received in step S60. When the personal computer 1 and the DVD drive 2 are legitimate, the encryption system and the encryption key in step S38 of the IEEE1394 interface board 51 in the DVD drive 2 are respectively identical to the encryption system and the encryption key in step S61 of the CPU 21 in the personal computer 1, and the encrypted random numbers also identical.

In step S62, the IEEE1394 interface board 33 in the personal computer 1 sends the random number Rb encrypted in step S61 to the DVD drive 2 via the network 4.

In step S39, the IEEE1394 interface board 51 in the DVD drive 2 receives the encrypted random number Rb from the personal computer 1. In step S40, the IEEE1394 interface board 51 in the DVD drive 2 determines whether the random number Rb encrypted in step S38 matches the encrypted random number Rb received in step S39. When it is determined that the random number Rb encrypted in step S38 fails to match the encrypted random number Rb received in step S39, the personal computer 1 is not legitimate. The personal computer 1 is not authenticated, and the process ends.

When it is determined in step S40 that the random number Rb encrypted in step S38 matches the encrypted random number Rb received in step S39, the personal computer 1 is legitimate. The process then goes to step S41. The IEEE1394 interface board 51 in the DVD drive 2 stores in the memory 53 the hash value Hb received in step S32.

Authenticating the personal computer 1, the IEEE1394 interface board 51 in DVD drive 2 generates a common key from the random number Ra and the random number Rb in step 42. The DVD drive 2 thus completes the process thereof.

Authenticating the DVD drive 2, the CPU 21 in the personal computer 1 generates a common key from the random number Ra and the random number Rb in step S63. The personal computer 1 thus completes the process thereof.

The DVD drive 2 stores the hash value of the content management data in the memory 53, and compares it with the hash value calculated by the personal computer 1 in the cross-authentication process. When the content management data has been tampered with, the DVD drive 2 does not authenticate the personal computer 1.

Since the DVD drive 2 stores in the memory 53 the hash value of the newly received content management data having tamper resistance in the cross-authentication process, the hash value of the new content management data is prevented from being tampered.

The personal computer 1 sends, to the DVD drive 2, the hash value of the content management data together with a random number which is generated each time. If any apparatus, pretending to be the personal computer 1, attempts to receive and store the hash value of the content management data for cross authentication, the cross-authentication process will be unsuccessful.

When the number of reproductions of the content data is not limited, the content management data, subsequent to the reproduction of the content data, calculated in step S53, may be identical to the content management data received in step S51.

Figure 8:
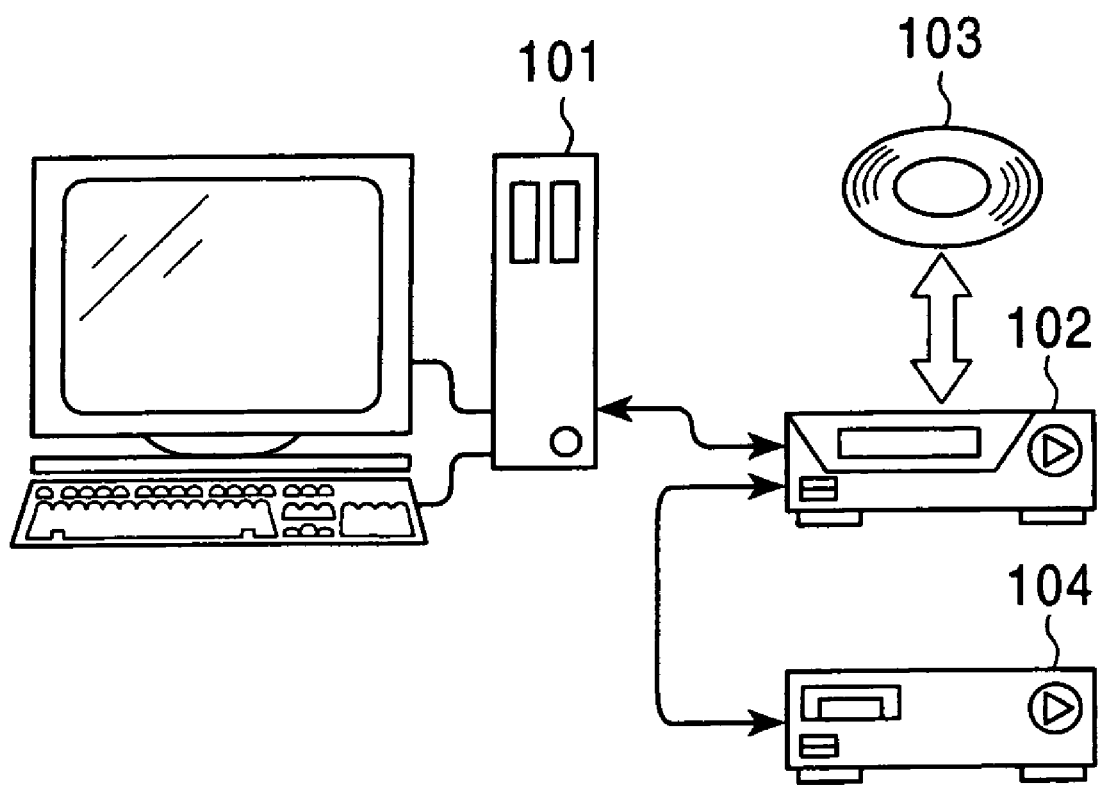
FIG. 8 illustrates another embodiment of the recording system.

Now discussed is another recording system in which the content data may be moved to the other recording medium while the content data stored in a recording medium is protected from unauthorized copying. FIG. 8 illustrates another embodiment of the recording system in which the content data can be moved. A personal computer 101 is connected to an MO (Magneto-Optical Disk) drive 102 and a hard disk device 104 through an SCSI (Small Computer System Interface).

The MO drive 102 reads the content data, namely, data of sound and images, recorded in a loaded MO disk 103, and feeds the personal computer 101 or the hard disk device 104 with the content data. The MO drive 102 stores, in a memory to be discussed later, a storage key, which is an encryption key encrypting a content key stored in the MO disk 103, and a hash value that is obtained by applying one-way hash function such as the MD5 to content management data.

The MO disk 103 records encrypted content data, a content key, which is an encryption key encrypting the content data, and content management data managing the usage of the content data.

The content data recorded in the MO disk 103 is encrypted with the content data based on a common encryption system such as the DES or IDEA.

The content management data is used to manage the content stored in the MO disk 103 in connection with the number of reproductions, the copying of the content data to another recording medium, and the movement of the content data to another recording medium, and the operation for any of these steps is authorized.

The content management data contains data indicating the authorized usage of the content data, and data indicating the number of the reproductions of the content data or the number of the copying of the content data. When the content data is used, the content management data is changed in the value thereof in response to the usage of the content data.

The content key is encrypted with a storage key stored in the memory of the MO drive 102.

The hard disk device 104 records, in a hard disk drive, the data supplied by the personal computer 101 or the MO drive 102, or feeds the personal computer 101 or the MO drive 102 with the data recorded therein.

Figure 9:
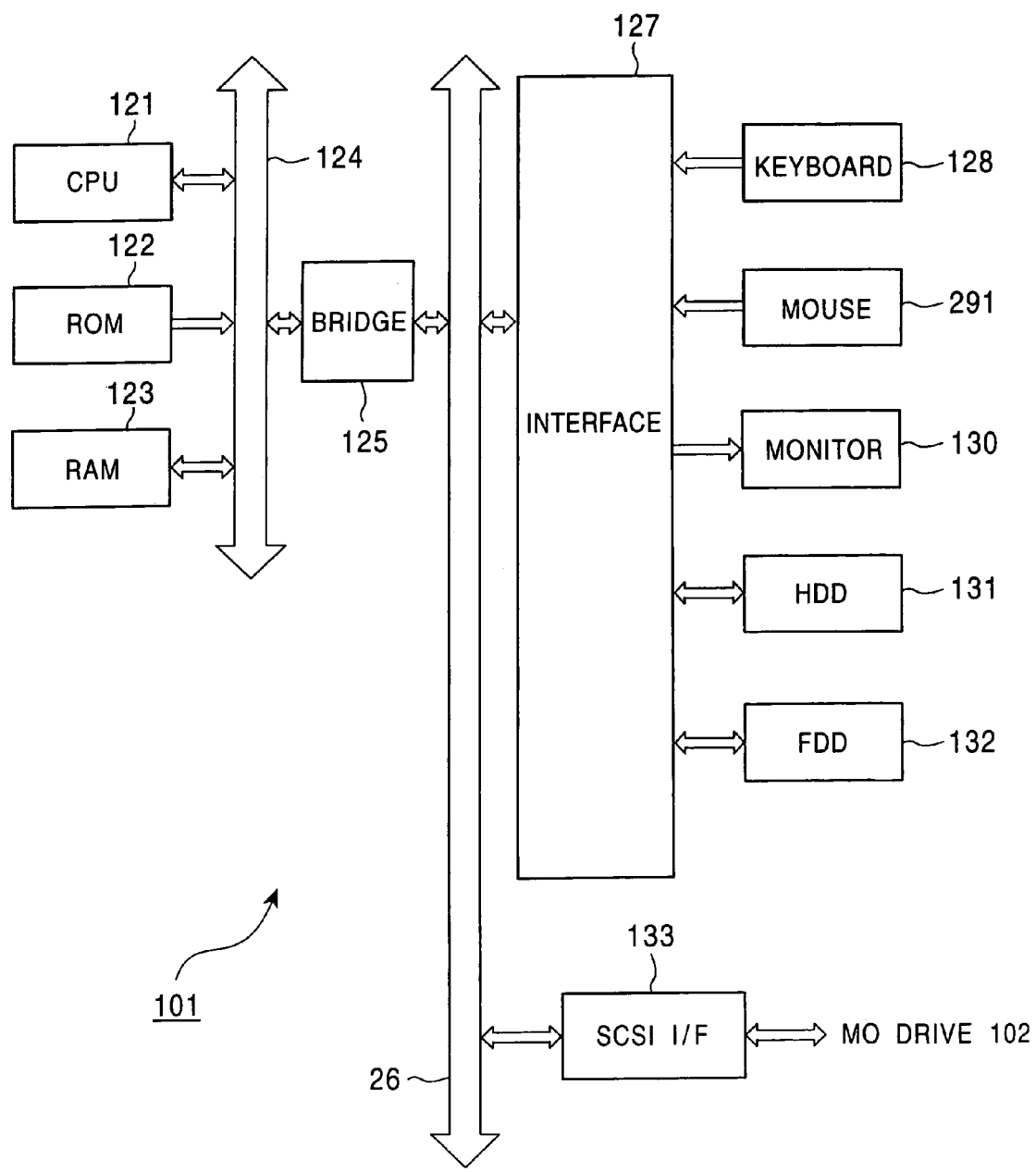
FIG. 9 is a block diagram illustrating the construction of a personal computer 101.

FIG. 9 is a block diagram illustrating the construction of the personal computer 101. The discussion of CPU 121 and FDD 132 is omitted here, because the CPU 121 and FDD 132 are respectively identical in construction to the CPU 21 and FDD 32 shown in FIG. 2.

An SCSI interface board 133, provided with predetermined SCSI cables attached thereto, feeds data supplied by the CPU 121, RAM 123, or HDD 131, to the MO drive 102 or the hard disk device 104, while feeding data received from the MO drive 102 or the hard disk device 104 to one of the CPU 121, RAM 123, and HDD 131.

The SCSI interface board 133 is connected to the CPU 121 via an external bus 126, a bridge 125, and a host bus 124.

Figure 10:
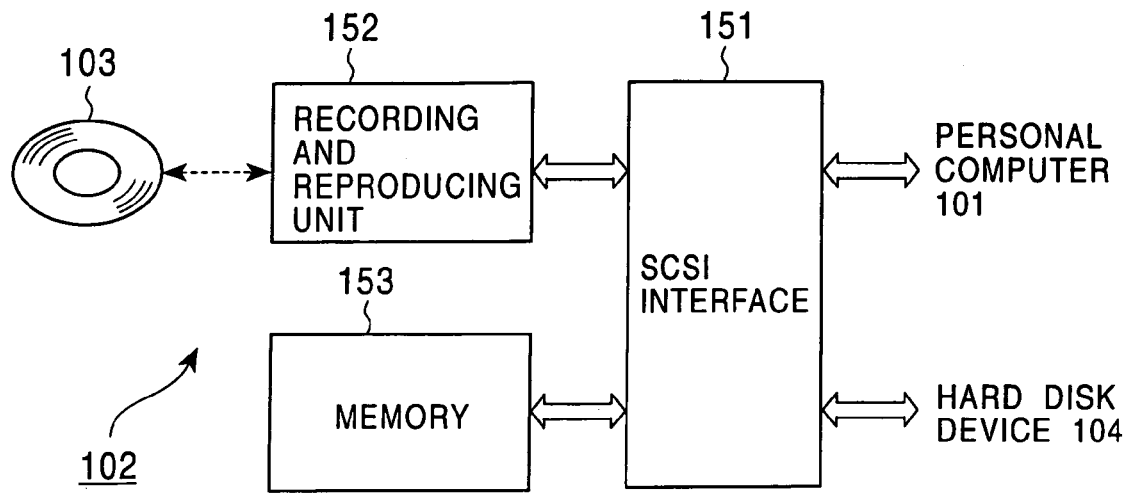
FIG. 10 is a block diagram illustrating the construction of an MO drive 102.

Referring to a block diagram shown in FIG. 10, the construction of the MO drive 102 is discussed. An SCSI interface 151, having SCSI cables attached thereto, feeds data, supplied by a recording and reproducing unit 152 or a memory 153, to the personal computer 101 or the hard disk device 104, while feeding data received from the personal computer 101 or the hard disk device 104 to the recording and reproducing unit 152 or the memory 153.

The SCSI interface 151 performs the cross-authentication process, discussed with reference to the flow diagram shown in FIG. 7, with the personal computer 101 or the hard disk device 104. Only during the cross-authentication process, the SCSI interface 151 reads data stored in the memory 153, while storing predetermined data onto the memory 153.

The memory 153 having an aluminum layer makes it difficult for a third party to understand the internal structure thereof, even if the memory 153 is physically disassembled. The memory 153 is a semiconductor memory and has a tamper resistance that permits the memory 153 to operate within a predetermined limited voltage range so that the memory 153 is hard to separately operate. The memory 153 stores the storage key and the hash value of the content management data.

The recording and reproducing unit 152 is loaded with the MO disk 103. The recording and reproducing unit 152 reads, from the loaded MO disk 103, content data, a content key, or content management data, and outputs these data to the SCSI interface 151, while recording, in the loaded MO disk 103, content data, a content key, or content management data supplied by the SCSI interface 151.

Figure 11:
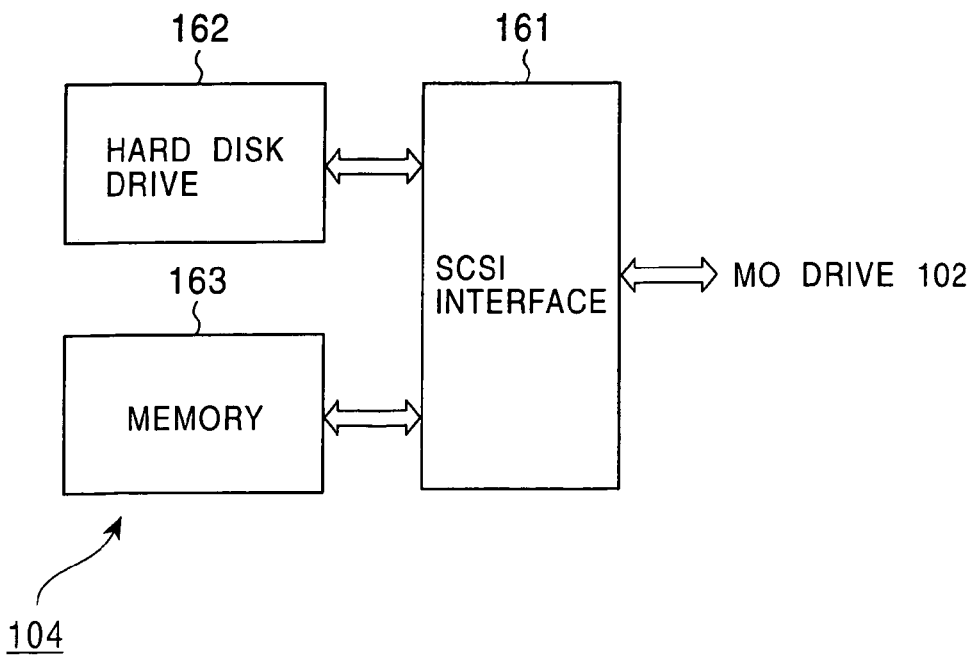
FIG. 11 is a block diagram illustrating the construction of a hard disk device 104.

Referring to a block diagram shown in FIG. 11, the construction of the hard disk device 104 is discussed. An SCSI interface 161, having SCSI cables attached thereto, sends data, supplied by a hard disk drive 162 or a memory 163, to the personal computer 101 or the MO drive 102, while outputting data, received from the personal computer 101 or the MO drive 102, to the hard disk drive 162 or the memory 163.

The SCSI interface 161 performs the cross-authentication process, discussed with reference to the flow diagram shown in FIG. 7, with the personal computer 101 or the MO drive 102. Only during the cross-authentication process, the SCSI interface 161 reads the data stored in the memory 163, while storing predetermined data onto the memory 163.

The memory 163 having an aluminum layer makes it difficult for a third party to understand the internal structure thereof, even if the memory 163 is physically disassembled. The memory 163 is a semiconductor memory and has a tamper resistance that permits the memory 163 to operate within a predetermined limited voltage range so that the memory 163 is hard to separately operate. The memory 163 stores the storage key and the hash value of the content management data.

The hard disk drive 162 reads content data, a content key, or content management data stored in a built-in hard disk, and outputs these data to the SCSI interface 161, while records, in the built-in hard disk, content data, a content key, or content management data supplied by the SCSI interface 161.

Figure 12:
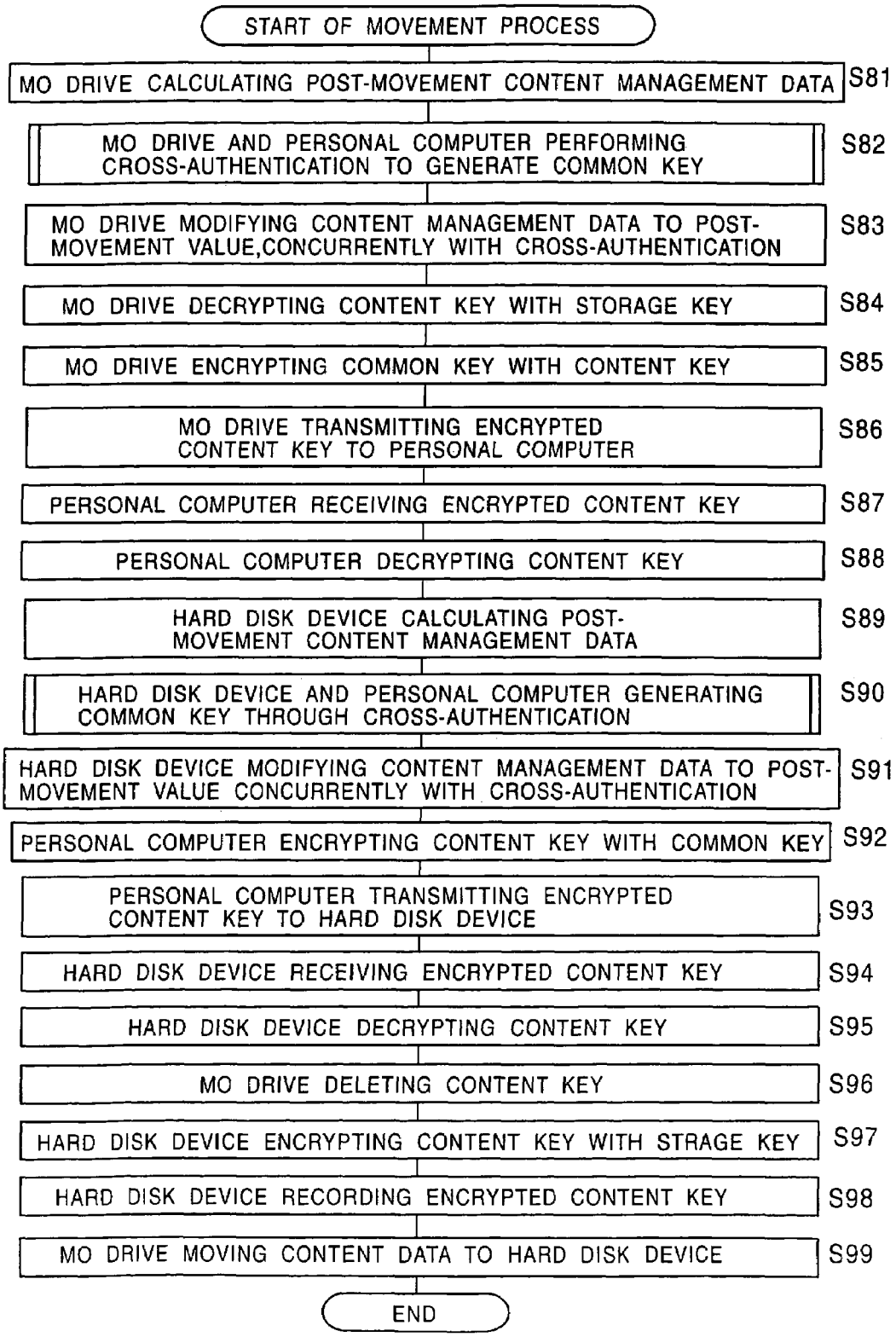
FIG. 12 is a flow diagram illustrating a movement process of content data.

FIG. 12 is a flow diagram showing the process of moving the content data, stored in the MO disk 103 loaded in the MO drive 102, to the hard disk drive 162 in the recording system shown in FIG. 8. In step S81, the recording and reproducing unit 152 in the MO drive 102 calculates post-movement content management data, based on the content management data stored in the MO disk 103. The recording and reproducing unit 152 supplies the SCSI interface 151 with the calculated post-movement content management data.

In step S82, the SCSI interface 151 in the MO drive 102 and the SCSI interface board 133 in the personal computer 101 perform the cross-authentication process in the same way as described with reference to the flow diagram shown in FIG. 7, thereby generating a common key K1.

In step S81, the SCSI interface board 133 sends current content management data and post-movement content management data to the personal computer 101, and the personal computer 101 calculates a hash value, based on the received current content management data and the received post-movement content management data.

In step S83, the SCSI interface 151 in the MO drive 102 causes the memory 153 to update the stored content management data to the post-movement value calculated in step S81, concurrently with the cross-authentication process in step S82.

In step S84, the SCSI interface 151 in the MO drive 102 causes the recording and reproducing unit 152 to read the content key from the MO disk 103, and decrypts the content key with the storage key stored in the memory 153.

In step S85, the SCSI interface 151 in the MO drive 102 encrypts the decrypted content key with the common key K1 generated in step S82. In step S86, the SCSI interface 151 in the MO drive 102 transmits the content key encrypted with the common key K1 to the personal computer 101.

In step S87, the SCSI interface board 133 in the personal computer 101 receives the encrypted content key from the MO drive 102.

In step S88, the CPU 121 in the personal computer 101 decrypts the content key, received in step S87, with the common key K1 generated in step S82.

In step S89, the hard disk drive 162 in the hard disk device 104 calculates post-movement content management data (to be used for the cross-authentication process).

In step S90, the SCSI interface 161 in the hard disk device 104 and the SCSI interface board 133 in the personal computer 101 perform the cross-authentication process in the same way as described with reference to the flow diagram shown in FIG. 7, thereby generating a common key K2. In the cross-authentication process between the personal computer 101 and the hard disk device 104, the personal computer 101 transmits, to the hard disk device 104, the post-movement content management data calculated in step S81 by the MO drive 102.

In step S91, the SCSI interface 161 in the hard disk device 104 updates the content management data stored in the memory 163 to the post-movement content management data received in step S90, concurrently with the cross-authentication process in step S90.

In step S92, the CPU 121 in the personal computer 101 encrypts the content key, decrypted in step S88, with the common key K2. In step S93, the SCSI interface board 133 in the personal computer 101 transmits the content key, encrypted with the common key K2, to the hard disk device 104.

In step S94, the SCSI interface 161 in the hard disk device 104 receives the content key, encrypted with the common K2, from the personal computer 101.

In step S95, the SCSI interface 161 in the hard disk device 104 decrypts the content key, received in step S94, with the common key K2.

In step S96, the recording and reproducing unit 152 in the MO drive 102 deletes the content key from the loaded MO disk 103.

In step S97, the SCSI interface 161 in the hard disk device 104 encrypts the content key, decrypted in step S95, with the storage key stored in the memory 163. In step S98, the hard disk drive 162 in the hard disk device 104 records the encrypted content key.

In step S99, the SCSI interface 151 in the MO drive 102 causes the recording and reproducing unit 152 to read the content data from the MO disk 103, and moves the content data to the hard disk device 104.

In the recording system shown in FIG. 8, the content data stored in the MO disk 103 is moved to the hard disk device 104. If an attempt is made to use the content data recorded in the other MO disk to which the content data is transferred from the MO disk 103, after the content data in the MO disk 103 is used, the cross-authentication process in step S82 reveals that the other MO disk is illegitimate. The content data transferred to the other MO disk therefore cannot be used.

In the above discussion, the recording media to which the content data is recorded are the DVD 3, the MO disk 103, or the hard disk. Alternatively, the recording media may be an optical disk, a semiconductor memory, a magnetic tape or printed matter (printed matter having two-dimensional bar codes printed thereon).

The content data recorded onto the recording medium is sound or images (including a moving image and a still image) in the above discussion. Alternatively, the content data may be a computer program, data (file) describing an access right to a predetermined server, or a ticket storing data for enjoying a predetermined service.

The devices for reproducing the content are the personal computer 1 or the personal computer 101 in the above discussion. Alternatively, the devices may be a home appliance such as a set-top box, a server, or a computer peripheral device such as a DVD drive.

If a program, executed by the personal computer 1 or the personal computer 101, for the reproduction or authentication of the content, is set to be difficult to analyze, protection against the unauthorized use of the content data is even more reinforced.

The personal computer 1, the personal computer 101, the DVD drive 2, the MO drive 102, and the hard disk device 104 transmit data or receive data through the network 4 or the SCSI cable in compliance with the IEEE1394 Standard. Alternatively, a different type of network and a different type of interface for data transmission may be employed.

A memory card, having a semiconductor memory therewithin and serially controlled, stores encrypted music data as the content data. To reproduce music, such a memory card is loaded into an interface of a predetermined personal computer.

To limit the number of reproductions of music, the content management data stored in the memory card is decremented in response to the number of the reproductions of the music. When the content management data becomes "zero", the personal computer having the memory card loaded therewithin cannot use the music data stored in the memory card any longer (cannot reproduce the music any longer).

The interface having the memory card mounted thereon may store the hash value of the content management data. If the content management data stored in the memory card is transferred to another memory card, the transferred music data can never be used once the music data in the memory card is used.

If the interface having the memory card mounted thereon monitors a signal output in the cross-authentication process, records and tampers with the signal, a successful cross-authentication process is impossible because the hash value of the content management data is transmitted together with a random number generated each time.

In this way, the unauthorized copying is prevented, regardless of the type of the recording media to which the content data is recorded, the type of signaling system for signal transmissions, and the type of interfaces.

In the above discussion, the memory 53, the memory 153, and the memory 163 store the hash values that are obtained by applying the hash function to the content management data. Alternatively, these memories may store content management data that is encrypted through the common key system such as the DES.

The above series of process steps may be executed by hardware or by software. When the series of the process steps are performed by software, a program constituting the software is installed from a program storage medium to a computer that may be assembled into dedicated hardware, or to a general-purpose personal computer which is capable of performing various functions with a variety of programs installed thereinto.

Figure 13:
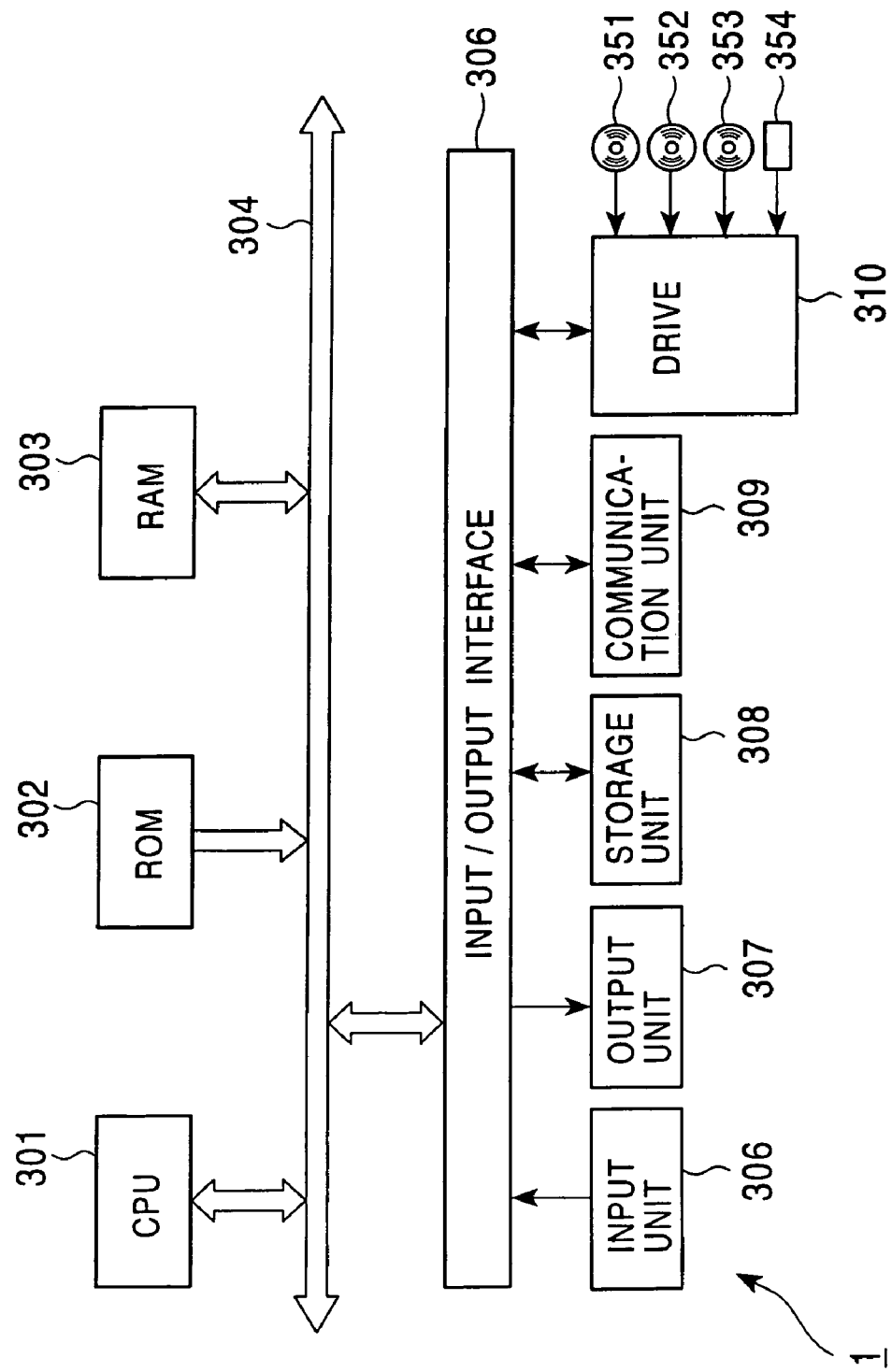
FIG. 13 illustrates a program storage medium.

As shown in FIG. 13, the program storage media for storing a program that may be installed and be ready to run in a computer may include a magnetic disk 351 (such as a floppy disk), an optical disk 352 (such as CD-ROM (Compact Disc-Read Only Memory) or DVD (Digital Versatile Disc)), MAGNETO-OPTICAL DISK 353 (such as MD (Mini Disc)), a package medium containing a semiconductor memory 354, ROM 302 that stores a program temporarily or permanently, and a hard disk forming a storage unit 308. The storing of a program into the program storage media may be performed via interfaces such as a router or a modem using wire or wireless communication media such as local area network, the Internet, and digital broadcasting satellite.

In the above discussion, steps describing the program stored in the program storage media may be sequentially executed in the order described here. However, it is not a requirement that the steps be sequentially executed in the order described here. Some of the steps may be performed concurrently in parallel or separately.

In the above discussion, the term system is intended to represent an entire system that may be composed of a plurality of apparatuses.

In accordance with the present invention, to authenticate the receiver device, the transmitter device stores the encrypted value of the second data, and transmits the second data to the receiver device, while receiving the encrypted value of the second data from the receiver device, and determines whether the encrypted value of the received second data matches the encrypted value of the stored second data. This arrangement prevents the unauthorized copying of the content data, and limits the number of uses of the content data.

In accordance with the present invention, to authenticate the transmitter device, the receiver device receives, from the transmitter device, the second data that describes the limitation on the usage of the first data while transmitting the encrypted value of the second data to the transmitter device, and generates an encrypted value of the second data based on the received second data. This arrangement prevents the unauthorized copying of the content data, and limits the number of uses of the content data.

In the communication system, to authenticate the receiver device, the transmitter device stores the encrypted value of the second data, and transmits the second data to the receiver device, while receiving the encrypted value of the second data from the receiver device, and the transmitter device determines whether the encrypted value of the received second data matches the encrypted value of the stored second data; and to authenticate the transmitter device, the receiver device receives, from the transmitter device, the second data that describes the limitation on the usage of the first data while transmitting the encrypted value of the second data to the transmitter device, and generates an encrypted value of the second data based on the received second data. This arrangement prevents the unauthorized copying of the content data, and limits the number of uses of the content data.

What is claimed is:

1. A transmitter device for transmitting a content to a receiver device comprising:
    a memory configured to store a hash value of a content management data in relation to said content;
    communicating means for transmitting said content management data of said content and receiving a hash value calculated at said receiver device on the basis of said content management data from said receiver device;
    comparing means for comparing said hash value in said storage and said hash value transmitted from said receiver device; and
    determining means for determining whether said content management data is tampered with based on a result provided by the comparing means.

2. The transmitter device according to claim 1 wherein said content management data is changed when said content is used and the status of said content is changed.

3. The transmitter device according to claim 1 wherein said content management data is in accordance with at least one of a reproduction of said content, a copying of said content, and a movement of said content.

4. The transmitter device according to claim 3 wherein said content management data is at least one of a number of said reproduction of said content and a number of the copying of said content.

5. The transmitter according to claim 1, further comprising:
    controlling means for controlling said communicating means to transmit said content to said receiver device when said determining means determines that said content management data has not been tampered with.

6. A computer implemented program that when executed by a processor implements steps comprising:
    storing a hash value of a content management data in relation to said content;
    transmitting said content management data of said content and receiving a hash value calculated at a receiver on the basis of said content management data from said receiver;
    comparing said hash value stored in said storing step with said hash value transmitted from said receiver; and
    determining whether said content management data has been tampered with based on a result by the comparing step.

7. The program of claim 6, wherein said content management data indicates an authorized usage of said content data.

8. The program according to 6, wherein said content management data is changed when said content is used and a status of said content is changed.

9. The program of claim 6, wherein said content management data is in accordance with at least one of a reproduction of said content, a copying of said content, and a movement of said content.

10. The program according to claim 9, wherein said content management data is at least one of a number of said reproductions of said content and a number of copies of the content.

11. The program according to claim 6, further comprising:
    controlling a transmitter that transmits said content management data in said transmitting step so as to transmit said content to said receiver when in said determining step it is determined that said content management data has not been tampered with.

12. A method for transmitting a content to a receiver device comprising:
    storing a hash value of a content management data in relation to said content;
    transmitting said content management data of said content and receiving a hash value calculated at a receiver on the basis of said content management data from said receiver;
    comparing said hash value stored in said storing step and said hash value transmitted from said receiver; and
    determining whether said content management data has been tampered with based on a result by the comparing step.

13. A program storage medium for storing a transmission process program for transmitting a content to a receiver device, said program storage medium including instructions that when executed by a transmitter device implement steps comprising:
    storing a hash value of a content management data in relation to a content;
    transmitting said content management data of said content and receiving a hash value calculated at a receiver on the basis of said content management data from said receiver;
    comparing said hash value stored in said storing step and said hash value transmitted from said receiver; and
    determining whether said content management data is tampered with based on a result of the comparing step.

* * * * *